(12) United States Patent
Sierra et al.

(10) Patent No.: US 11,339,704 B2
(45) Date of Patent: May 24, 2022

(54) EXHAUST SUBSYSTEM WITH FIBER PIPE AND METHOD OF FORMING FIBER PIPE

(71) Applicant: NOVO PLASTICS INC., Markham (CA)

(72) Inventors: Baljit Sierra, Richmond Hill (CA); Udo Gaertner, Sinntal-Sannerz (DE)

(73) Assignee: NOVO PLASTICS INC., Markham (CA)

( * ) Notice: Subject to any disclaimer, the term of this patent is extended or adjusted under 35 U.S.C. 154(b) by 161 days.

(21) Appl. No.: 16/461,530

(22) PCT Filed: Nov. 18, 2016

(86) PCT No.: PCT/CA2016/051351
§ 371 (c)(1),
(2) Date: May 16, 2019

(87) PCT Pub. No.: WO2018/090124
PCT Pub. Date: May 24, 2018

(65) Prior Publication Data
US 2019/0353078 A1    Nov. 21, 2019

(51) Int. Cl.
*F01N 13/08* (2010.01)
*B28B 21/48* (2006.01)
(Continued)

(52) U.S. Cl.
CPC .............. *F01N 13/08* (2013.01); *B28B 21/48* (2013.01); *B28B 21/56* (2013.01); *B28B 21/72* (2013.01);
(Continued)

(58) Field of Classification Search
CPC .. F01N 2530/18; F01N 2530/20; F01N 13/08; F01N 1/082; F01N 1/089;
(Continued)

(56) References Cited

U.S. PATENT DOCUMENTS 3,794,708 A * 2/1974 Richards ................. B29C 53/60
156/189
4,930,597 A * 6/1990 Udell ......................... F01N 1/02
181/256
(Continued)

FOREIGN PATENT DOCUMENTS

| | | |
|---|---|---|
| CA | 2228992 A1 | 9/1999 |
| CA | 2806707 A1 | 9/2011 |
| EP | 0446064 A2 | 9/1991 |

OTHER PUBLICATIONS

Extended European Search Report dated Mar. 23, 2020 in related European Patent Application No. 16921795.7, filed on Nov. 18, 2016.
(Continued)

*Primary Examiner* — Jeremy A Luks
(74) *Attorney, Agent, or Firm* — Dinsmore & Shohl LLP

(57) ABSTRACT

A substantially metal-free exhaust subsystem includes an exterior housing formed of polymer; and a pipe formed of a layered fibers formed at least partially of glass, and bound by an inorganic binder. The fibers may be glass or ceramic, and may define micro-pores on the interior of the pipe that aid in absorbing acoustic energy, and thereby attenuating exhaust noise.

16 Claims, 9 Drawing Sheets

(51) Int. Cl.
    *B28B 21/72*     (2006.01)
    *F01N 1/08*     (2006.01)
    *F01N 1/10*     (2006.01)
    *F01N 13/14*     (2010.01)
    *F01N 13/16*     (2010.01)
    *G10K 11/16*     (2006.01)
    *G10K 11/162*     (2006.01)
    *B28B 21/56*     (2006.01)
    *B28B 21/78*     (2006.01)

(52) U.S. Cl.
    CPC .............. *B28B 21/78* (2013.01); *F01N 1/082* (2013.01); *F01N 1/089* (2013.01); *F01N 1/10* (2013.01); *F01N 13/145* (2013.01); *F01N 13/16* (2013.01); *G10K 11/161* (2013.01); *G10K 11/162* (2013.01); *F01N 2310/02* (2013.01); *F01N 2470/02* (2013.01); *F01N 2470/24* (2013.01)

(58) Field of Classification Search
    CPC .......... F01N 1/10; F01N 13/145; F01N 13/16; B28B 21/48; B28B 21/72; B28B 21/42; G10K 11/161; G10K 11/162
    USPC ......................................................... 181/246
    See application file for complete search history.

(56) References Cited

U.S. PATENT DOCUMENTS

| | | | | |
|---|---|---|---|---|
| 5,400,830 | A * | 3/1995 | Stiles | F01N 13/14 138/110 |
| 5,670,756 | A * | 9/1997 | Ohtaka | F01N 1/24 181/256 |
| 6,138,791 | A * | 10/2000 | Zanzie | F01N 1/24 181/252 |
| 6,148,955 | A * | 11/2000 | Wolf | D04H 3/004 181/252 |
| 6,668,972 | B2 * | 12/2003 | Huff | B60K 13/04 181/228 |
| 7,325,652 | B2 * | 2/2008 | Huff | B60R 19/48 181/209 |
| 7,810,609 | B2 * | 10/2010 | Sikes | F01N 13/16 181/250 |
| 8,424,636 | B2 * | 4/2013 | Jones | F01N 13/16 181/246 |
| 8,505,682 | B2 * | 8/2013 | Jones | F01N 1/084 181/246 |
| 9,593,798 | B2 * | 3/2017 | Niwa | F01N 13/148 |
| 2007/0157598 | A1 * | 7/2007 | Atanas | F01N 13/08 60/272 |
| 2007/0240932 | A1 | 10/2007 | Van De Flier et al. | |
| 2009/0183502 | A1 * | 7/2009 | Leroy | F01N 13/14 60/323 |
| 2009/0194364 | A1 | 8/2009 | Leboeuf et al. | |
| 2012/0261021 | A1 * | 10/2012 | Saiki | F16L 58/04 138/145 |
| 2013/0126034 | A1 * | 5/2013 | Sierra | F01N 1/24 138/148 |
| 2014/0065331 | A1 * | 3/2014 | Ridolfi | F01N 13/16 428/34.1 |

OTHER PUBLICATIONS

International Search Report and Written Opinion pertaining to PCT/CA2016/051351, filed Nov. 18, 2016, 3 pages.

* cited by examiner

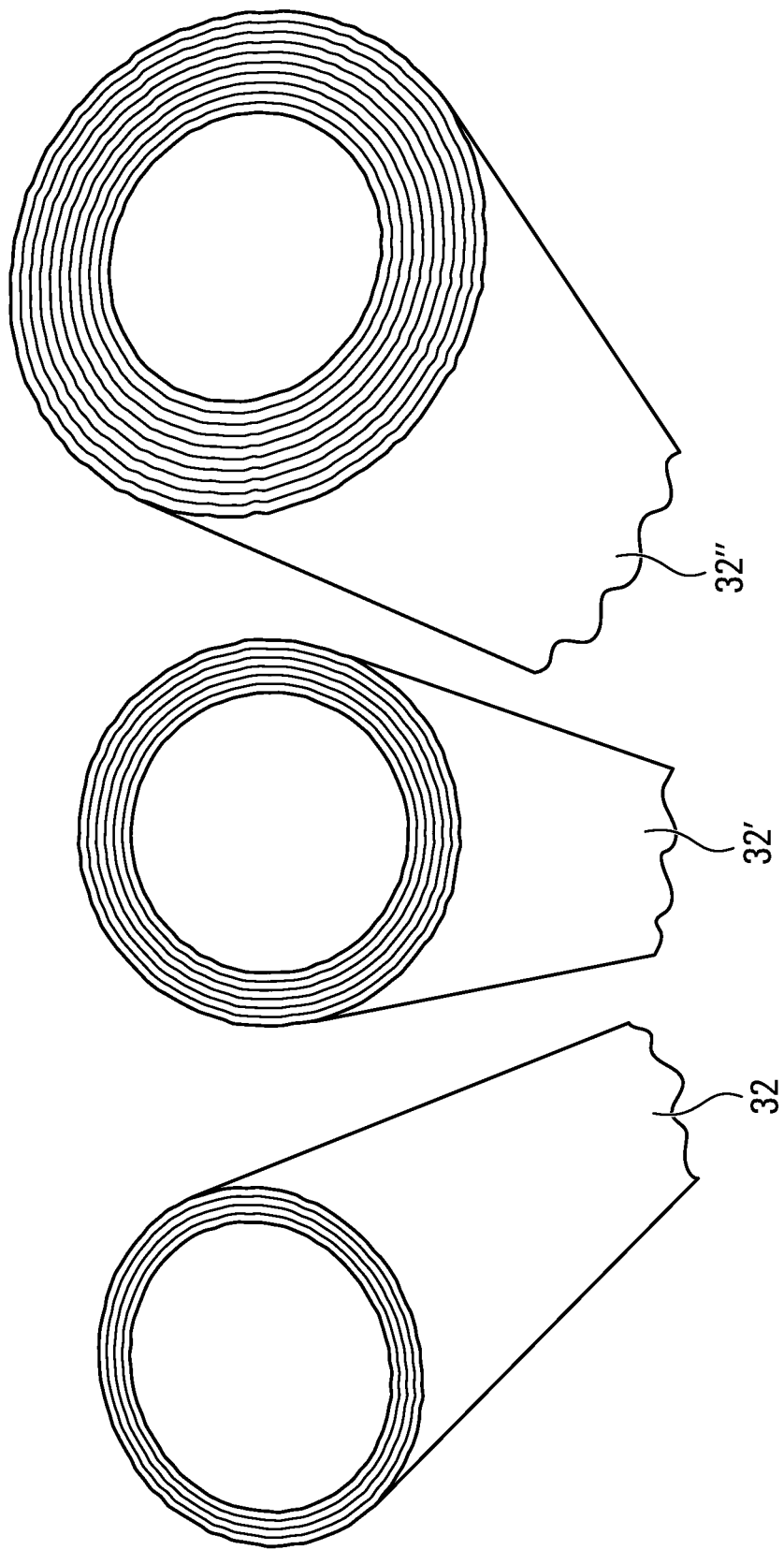

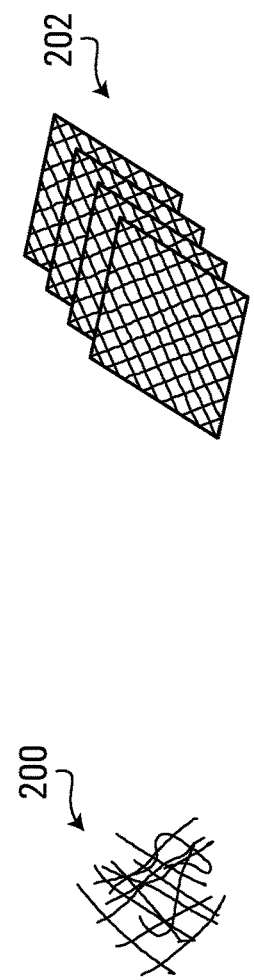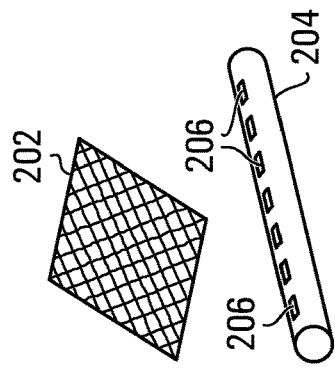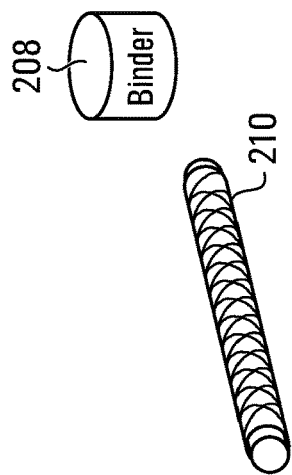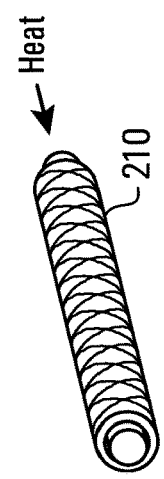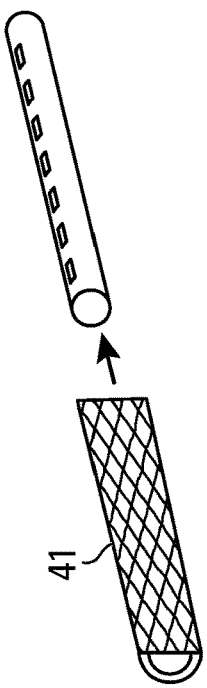

EXHAUST SUBSYSTEM WITH FIBER PIPE AND METHOD OF FORMING FIBER PIPE

TECHNICAL FIELD

This relates generally to exhaust assemblies and methods, and more particularly to exhaust subsystems formed substantially of polymer and fiber (e.g. glass).

BACKGROUND

Vehicle exhaust assemblies are typically formed of sheet metal or stainless steel to allow the transport of hot exhaust gases from a combustion engine away from the vehicle. Metal is typically primarily used to allow the exhaust system to withstand high temperatures, and transfer heat away in the gases away from the vehicle.

Metal, of course, has its limitations. In particular, it is somewhat heavy. Also the shapes that can be formed are somewhat limited. Further, it is prone to corrosion. And in exhaust applications, it tends to get hot.

More recently, synthetic materials, such as polymers, have been introduced into vehicle exhaust assemblies. The polymer material is less costly, lighter, and less susceptible to corrosion. At the same time, such materials are typically less able to dissipate heat, and require heat resistant components.

Nevertheless exhaust systems that incorporate synthetic materials are in early stages of development. Often, they continue to rely on steel components.

Accordingly, there remains a need for exhaust systems and subsystems that take advantage of synthetic materials.

SUMMARY

According to an aspect, there is provided an exhaust subsystem comprising an exterior housing formed of polymer; a pipe carried by the exterior housing, that emits gases into the housing to attenuate sound; wherein the pipe is formed of a layered fibers formed at least partially of glass, and bound by an inorganic binder.

According to another aspect, there is provided a method of forming a pipe for use in an exhaust subsystem comprising forming and curing at least one layer comprising fiber material and an inorganic binder on a molding core, and curing the inorganic binder to form the pipe.

Other features will become apparent from the drawings in conjunction with the following description.

BRIEF DESCRIPTION OF THE DRAWINGS

In the figures which illustrate example embodiments,

FIG. 7 is a perspective view of fiber pipes used in an example exhaust subsystem;

FIGS. 8A-8F are schematic views illustrating the formation of pipe of FIG. 7.

DETAILED DESCRIPTION

Figure 1:
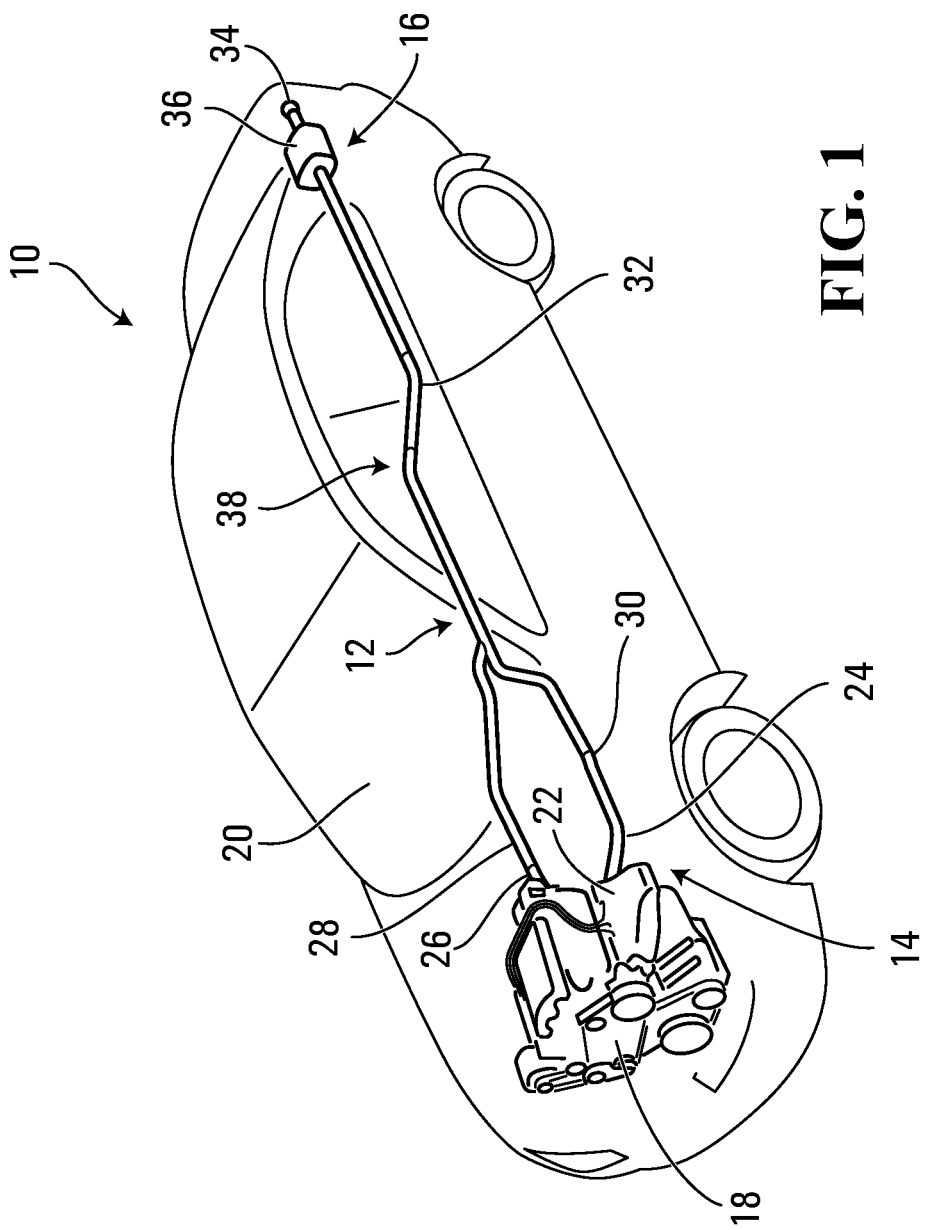
FIG. 1 is a schematic view of a vehicle including an exhaust assembly and exhaust subsystem, exemplary of an embodiment of the present invention.

FIG. 1 illustrates a vehicle 10 which includes an exhaust assembly 12, formed of two separate exhaust subsystems: a forward exhaust subsystem 14; and an aft exhaust subsystem 16, having a polymeric exterior housing, and fiber pipes 32, 34 exemplary of an embodiment of the present invention.

As illustrated in FIG. 1, vehicle 10 includes an internal combustion engine 18, located forward of a passenger compartment 20. Exhaust assembly 12 interconnects to internal combustion engine 18 and guides exhaust gases from internal combustion engine 18 to the rear of vehicle 10, allowing those gases to exhaust away from vehicle 10. Forward exhaust subsystem 14 is in fluid communication with internal combustion engine 18, and may include one or more exhaust components, such as exhaust manifolds 22, catalytic convertors/particle filters 24, and one or more pipes 26 emanating from internal combustion engine 18 and connected in flow series. Forward exhaust subsystem 14 is further in flow communication with aft exhaust subsystem 16. Aft exhaust subsystem 16 is located downstream of forward exhaust subsystem 14, in the direction of exhaust flow.

Figure 2:
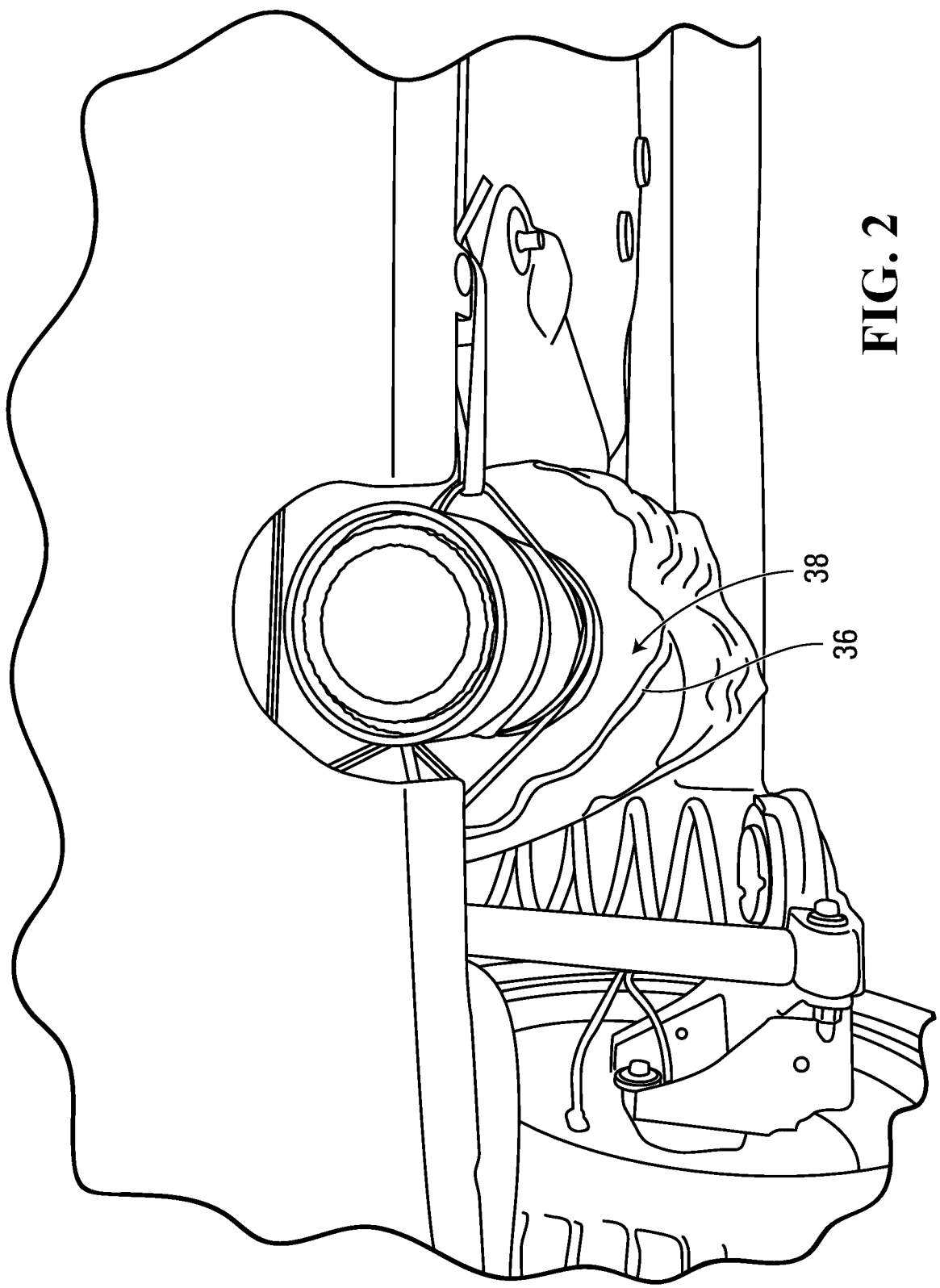
FIG. 2 is an end perspective view of an exhaust subsystem and muffler of FIG. 1.

In the depicted embodiment, aft exhaust subsystem 16 terminates near the rear of vehicle 10, as more particularly illustrated in FIG. 2.

Exhaust subsystems 14, 16 are physically mounted to the vehicle in a conventional manner, for example, by being suspended from the chassis of vehicle 10. Forward exhaust subsystem 14 may define one or more flow paths between internal combustion engine 18 and aft exhaust subsystem 16. As illustrated, forward exhaust subsystem 14 may provide a discrete flow path 28 on each side of internal combustion engine 18 to aft exhaust subsystem 16. Multiple flow paths 28 may converge to a single path to feed aft exhaust subsystem 16.

Aft exhaust subsystem 16 may include pipe 32 muffler 36, and tail pipe 34. Aft exhaust subsystem 16 may further include one or more coupling assembly(ies) 30 and additional pipe segment(s) which connect forward exhaust subsystem 14 with aft exhaust subsystem 16. Coupling assemblies 30 provide an interface between the substantially polymeric components of aft exhaust subsystem 16 and forward exhaust subsystem 14. As illustrated, coupling assembly 30 is located downstream of the catalytic convertor/particle filter 24 of vehicle 10. However, coupling assembly 30 may be located anywhere downstream of exhaust manifold 22 of vehicle 10.

As will be appreciated, engine 18 produces high-temperature and pressure and expels exhaust gases. Exhaust gases travel through sealed forward exhaust subsystem 14. Partially cooled exhaust gases exit from forward exhaust subsystem 14 into aft exhaust subsystem 16 by way of coupling assembly 30.

As exhaust gases propagate along pipes of forward exhaust subsystem 14, exhaust gases gradually cool.

Figure 3:
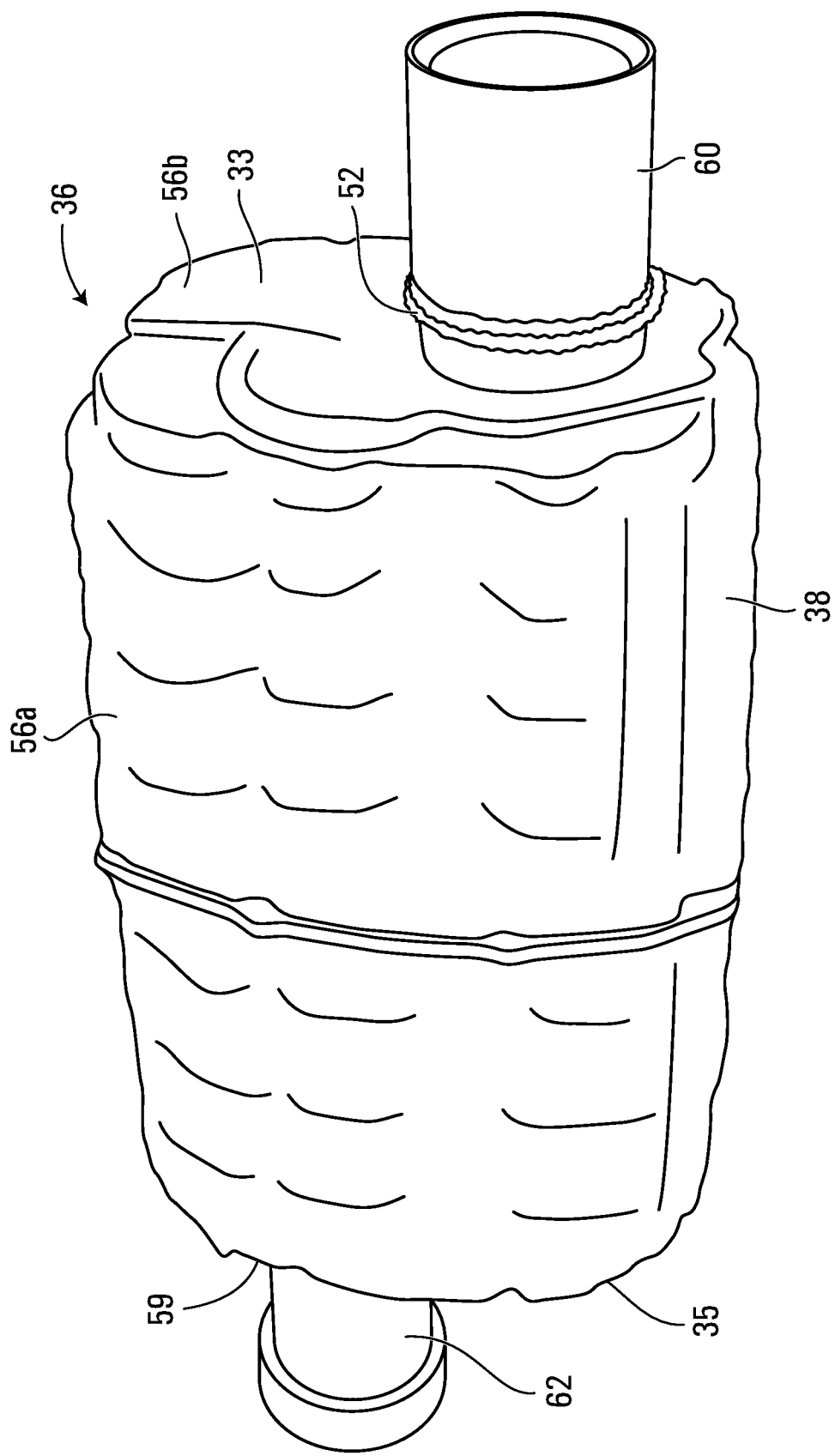
FIG. 3 is a perspective view of a portion of the exhaust subsystem including the muffler of FIG. 2.

As illustrated in FIGS. 2-6, muffler 36 of aft exhaust subsystem 16 is housed in a non-metal exterior housing 38. As illustrated in FIG. 3, example housing 38 is generally oval in cross-section, and may have a generally constant cross-section. Other shapes will be apparent to those of ordinary skill. For example, housing 38 could have an arbitrary shape—it may for example have a round or varying cross-section, it might be rectangular, etc., depending on application. Housing 38 defines an interior cavity 40, shown in FIGS. 4-6.

End walls 33 and 35 cap the end of housing 38, and include generally circular opening 52, 54. Openings 52 and 54 are laterally offset from each other, with openings 52, 54 on either side of a central axis (generally parallel of the flow of gases through muffler 36) of muffler 36. Polymeric sleeves 60, 62 may be formed on wall 33, 35 and extend about openings 52, 54.

Housing 38 may be formed in two housing halves—a top half 56a and a bottom half 56b, as illustrated in FIG. 3. The two halves 56a, 56b may each be formed of polymer, and include fitting groves and notches to align halves 56a and 56b and may be screwed together or otherwise affixed to each other to form a closed shell. Again, other geometries will be readily apparent to those of ordinary skill. For example, housing 38 could be formed as central body with end caps.

Figure 4:
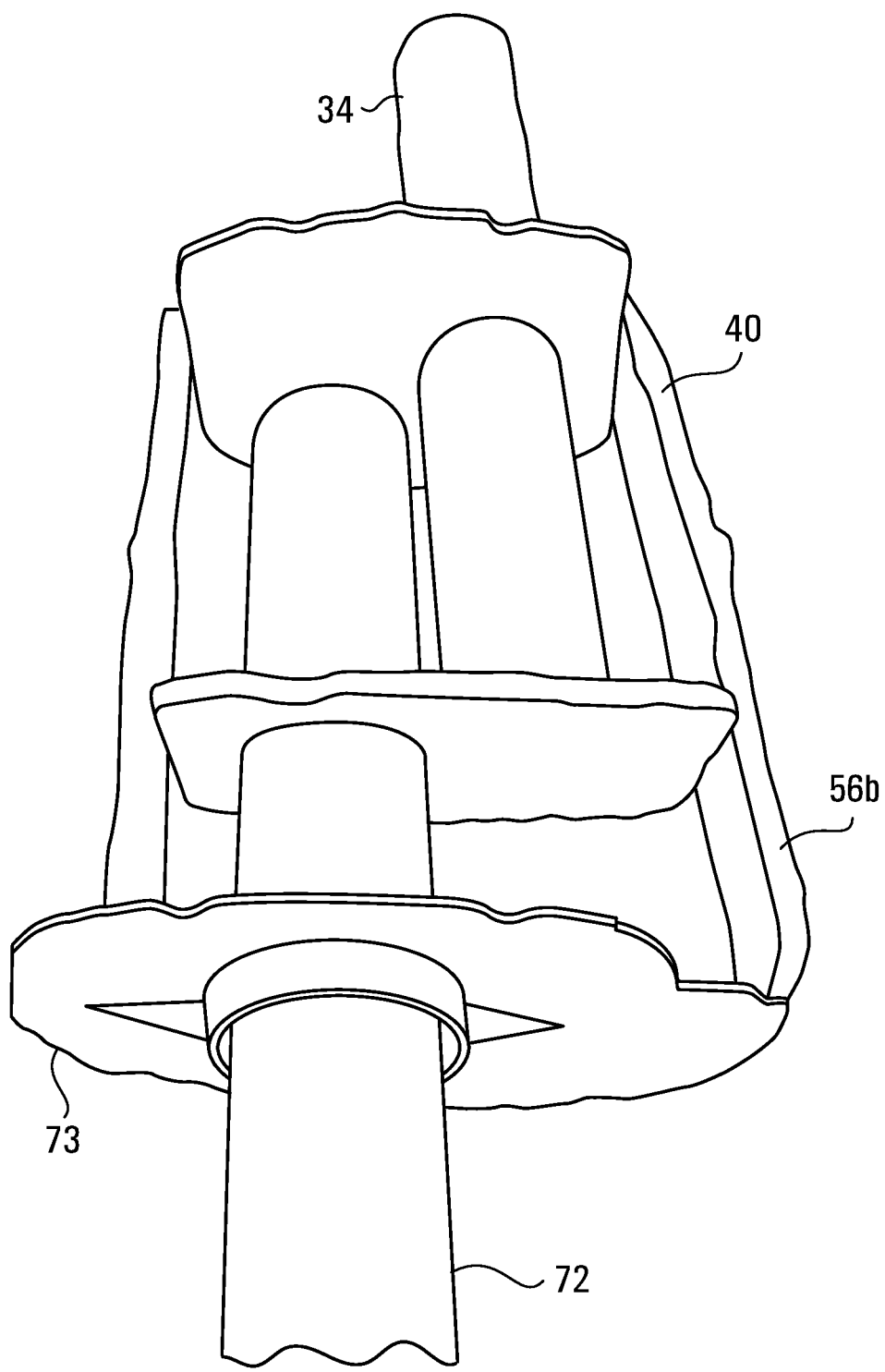
FIGS. 4-6 are perspective views of the muffler of FIG. 3, partially open.
Figure 5:
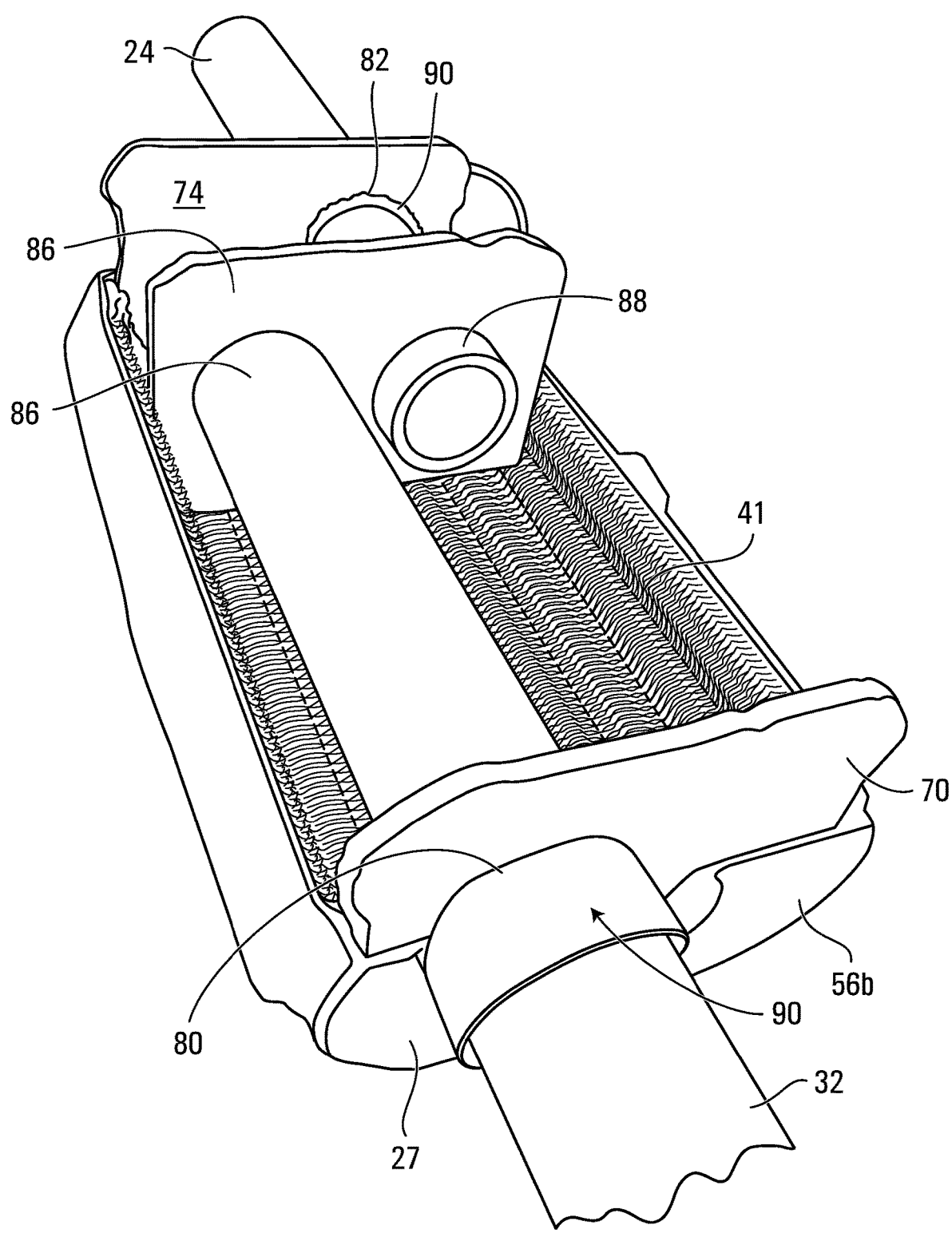
Figure 6:
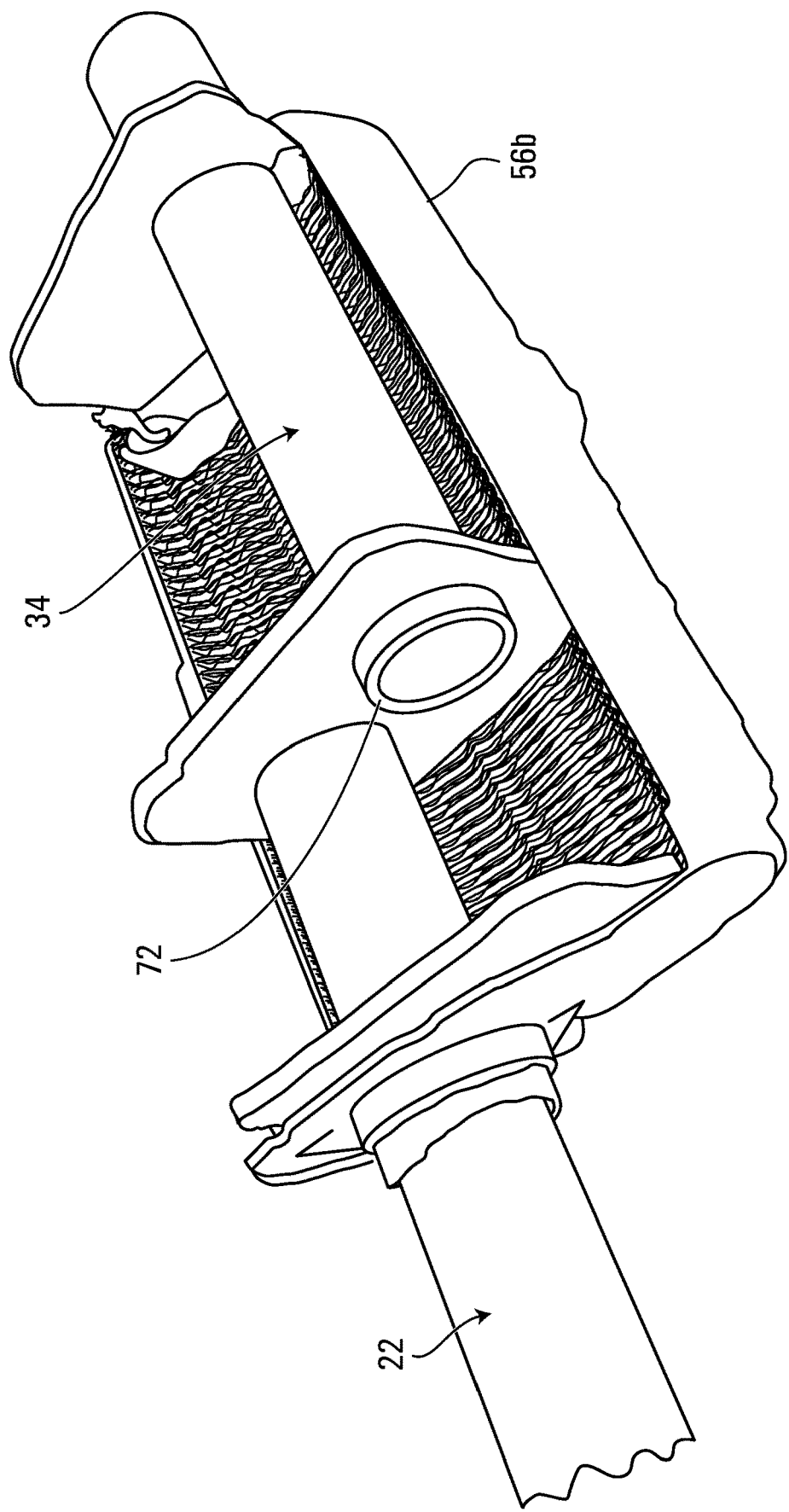

Interior 40 of muffler 36 is depicted in FIGS. 4-6. As illustrated, pipes 32, 34 extend through openings 52, 54 respectively and are supported by laterally offset interior walls 70, 72 and 74. Interior walls 70, 72, 74 may rest within slots the bottom half 56b of housing 38.

Each of walls 70, 74 has an opening 80, 82, complementary to openings 52, 54 in end walls 33 and 35. As illustrated, pipe 32 extends through opening 52 in end wall 33; through opening 80 in wall 70; and through opening 86 of wall 72.

Outer wall of pipe 32 fit snugly in openings 52, 80, and 86. A further filler material 90 may be placed around pipe 32 to generally seal any gap between pipe 32 and opening 52. Filler material 90 may rest between pipe 32 and skirt 60 in the form of a polymeric sleeve. Filler material 90 may be glass fiber—in sheet or loose form; a gel, glue or the like. Outer wall of pipe 34 likewise fits snugly in openings 54, 82, and 88. Pipe 32 is therefore supported by walls 70 and 72, while pipe 34 is supported by walls 74 and 72.

Ends of pipes 32, 34 also each rest within openings 86, 88 in center wall 72. In this way, exhaust gases exiting one pipe 32 may be transferred to the upstream opening of pipe 34 to and exhausted from aft subsystem 16, through pipes 34.

As gases are exchanged between pipes 32 and 34, energy and heat may be dissipated within cavity 40. To that end, cavity 40 may be line with a polymeric or insulation layer 41 formed of fiber or other material that is configured to absorb sound and heat. As depicted, insulation layer 41 may take the form of a mat liner mounted or affixed to the interior of housing 38. Optionally, insulation layer 41 may also include other liner material in the form of fiber or the like within cavity 40. Optionally, layer 41 could be molded to conform to the interior of cavity 40 and made of mineral fibers, ceramics or the like.

Housing 38 may be formed by forming upper and lower casings 56a, 56b, using conventional polymer molding techniques—e.g. blow moulding or injection molding.

Walls 70, 72, 74 may be cut from a suitable material—such as a polymer or fiberglass.

Example pipes 32, 34 may be formed of a fiber material that may be microporous, and define an interior passage 31. In the depicted embodiment the fiber material may be inorganic glass fibers bound by an inorganic binder. Other fiber materials could be used, including ceramics, plastics or composites or mixtures thereof.

As a consequence, pipes 32, 34 act as thermal insulators, retaining much of the heat transported by exhaust gases emanating with engine 18 (FIG. 1), without dissipating this heat into cavity 40, and thereby heating housing 38 beyond an acceptable temperature. As will be appreciated, exhaust gases typically have temperatures in excess of 500° C. and often in excess of 900° C.

Moreover, glass fiber of pipe 32 defines micropores on the interior passage 31 of pipe 32, as for example illustrated in FIG. 7. These micropores absorb mechanical energy, and in particular acoustic energy, in gases transported through pipes 32, thereby reducing exhaust noise.

The porosity required will depend on the desired frequency range of attenuation, to which the muffler 36 is to be tuned. Not surprisingly, this frequency of attenuation typically influences the overall exhaust subsystem geometry (e.g. the size and configuration of chambers in muffler 36). A typical muffler may, for example, be designed to attenuate sounds with frequencies between 50 Hz and 1500 Hz. The inorganic binder that is used on the glass fiber of pipe 32 may leave fibers loose but embedded in the binder. The fibers may be spaced and/or loose to provide, in combination with the binder, the micropores. The binder may be chosen to prevent the dislodging of the glass fibers from the pipe. As well, the higher the frequency the higher the absorption grade of the fiber used. As will be appreciated, the resulting porosity and/or loose fiber may create additional friction on gases within the pipe and muffler that assist acoustic attenuation, beyond mere reflection in muffler 36. As will be appreciated, a skilled may select appropriate binder and fibers to achieve a desired porosity and attenuation in pipe 32 using know acoustic tuning techniques.

Although insulation layer 41 may provide sufficient thermal protection, to ensure that heat absorbed from the exhaust gases does not cause exterior pipe 32 to melt or materially deform, insulation layer 41 limits the amount of heat that may be transferred from the exhaust gases to aft exhaust subsystem 16. As a consequence, exhaust gases exiting aft exhaust subsystem 16 exit at higher temperatures than they would in the absence of insulation layer 41. With modern combustion engines, this remains acceptable as such engines produce lower temperature exhaust gases.

In any event, engine 18, in operation, also causes sound waves to propagate down pipe 32. The sounds created by engine 18 may be particularly loud within a certain characteristic frequency range, which is determined by factors including the operating speed (revolutions per minute), number of cylinders and configuration of cylinders of engine 18. Sound waves are created by pulses of high pressure emitted from engine 18, which pass through forward exhaust subsystem 14 to and through aft exhaust subsystem 16.

As the sound waves travel through pipe 32 to muffler 36, they may be attenuated in several ways. Specifically, the sound waves may be attenuated by micropores in pipe 32 or in muffler 36.

Each of pipes 32, 34 may be formed as schematically illustrated in FIGS. 8A-8F.

As illustrated in FIGS. 8A-8F, raw glass (or other—e.g. ceramic) fibers 200 may be formed into sheets 202. Sheets 202 may be woven, knitted, stamped or otherwise manipulated fibers 200 to form sheets 202. Fibers 200 may for example calcium-silicate fiber strands, as for example made available by HKO under the trademark Hakotherm. Example fibers may have a heat resistance of 750° C. and a softening temperature of 916° C. or higher. Other suitable fibers may be chosen from available is ECR (E-Glass Corrosion Resistant) glass fibers or ceramic fibers/solids, as available from DBW (Powerfil, Powermat, Powertex), Owens Corning (Advantex), Culimeta (Acousta-fil, Vitri-Mat), or others.

Each sheet 202 may be placed atop a molding core 204. Molding core 204 may take the form hollow pipe, with an outer diameter corresponding to the inner diameter of pipes 32, 34. Molding core 204 may be formed of a thermally conductive material, such as metal—e.g. steel, copper, iron, etc. or a suitable alloy; a ceramic; or other material that may be heated and transfer heat to pipe 32, 34 to allow curing, as described below.

The thickness of core 204 may be several millimetres (e.g. 5-8 mm). Molding core 204 may include a number of apertures 206 on the outer surface of pipe. Apertures 206 may be in flow communication with the interior of pipe 204, to allow air or other gas to flow through the interior of molding core 204.

A layer 210 of sheets 202 formed on core 204 may then be covered with a binder 208 (FIG. 8D). Binder 208 may take the form of an inorganic binder, such as those that are silicate or silica based. The binders should be resistant to heat and vibration as experienced in muffler applications. Suitable binders may be inorganic molecules. Inorganic binders suitable for the manufacture of glass fiber composites that perform at high temperatures may include alumino-silicate-based geopolymeric systems (e.g., those available from Pyromeral Systems S.A., Barbery, France) and colloidal silica systems (e.g., LUDOX® products, available from W.R. Grace & Co., Columbia, Md., U.S.A.).

Binder 208 may be applied after sheets 202 are placed on molding core 204, or may be applied with each sheet 202—for example by soaking sheet 202, or otherwise impregnating or coating fibers 200 prior to application of sheet 202.

Once an initial layer 210 is formed, subsequent layers 210 of sheets 202 may be formed atop the initial layer. Each subsequent layer of glass sheets 202 may be formed atop previously formed layers of sheet and bound by binder 208.

Once a desired number of layers 210 of sheets 202 are placed atop molding core 204, the multiple layers 210 may be cured. This may, for example, be facilitated by heating core 204.

For example, heated gases may be flowed through the interior of molding core 204 to cure resulting pipe 32 or 34. The heated gases may take the form of hot air, heated to temperatures to between 100° C.-350° C. or hotter. Hot air entering pipe defining molding core 204 may exit apertures 206. The temperature of the air and curing time will depend on the number of layers 210, and therefore the overall thickness of the resulting pipe 32, 34. Generally, the thicker the pipe the longer the curing time.

Example pipe 32 and pipes 32' and 32" formed as described with reference to FIGS. 8A-8F are illustrated in FIG. 7.

Example binders, once cured may be heat resistant to about 500° C., 700° C., 900° C. or higher temperatures.

Once cured, pipe 32/34 may be removed from molding core 204 (or likewise, molding core 204 may be removed from pipe 32/34).

The exterior of pipe 32 may then be painted, buffed, sanded or otherwise finished. In an embodiment, pipe 32 may be perforated by a series of holes formed in pipe 32. Pipe 32 may perforated by drilling. In alternate embodiments, molding core 204 may include protrusions used to form such perforations.

Pipes 32/34 when formed may be mounted in housing 38 to form muffler 36. The resulting muffler 36 is substantially or entirely free of metal, and is therefore much lighter than a conventional muffler.

As will be appreciated pipes 32/34 are depicted as straight, with uniform cross-sections. Pipes 32/34 or similar pipes could be formed of arbitrary shapes—e.g. having differing cross sections, bends, openings, contours, or the like. To that end, a pipe as depicted in U.S. Pat. No. 9,194,513 (the contents of which are hereby incorporated by reference) may be formed as described herein.

Figure 9:
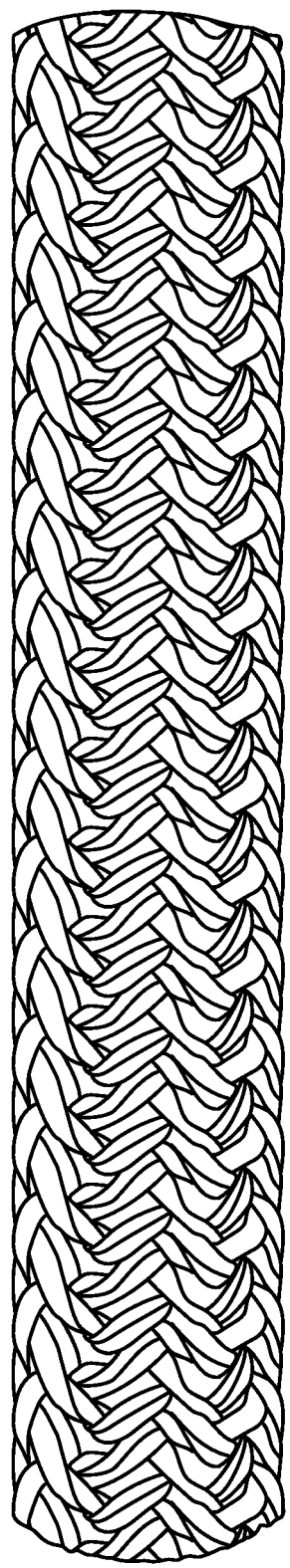
FIG. 9 is a perspective view an alternate arrangement of fibers used in the formation of fiber pipes.

In yet alternate embodiments, an example glass fiber pipe could be formed by placing loose or braided fibers on molding core 204, along with binder 208. Again, multiple layers of loose or braided fibers could be placed, bonded and cured. An example arrangement of braided fibers is illustrated in FIG. 9.

Conveniently, aft exhaust subsystem 16 may extend all the way to the exhaust system exit, and may obviate the need for a volume muffler. Conveniently, sound attenuation may occur all the way along the length of pipes 32, 34.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. An exhaust subsystem comprising:
an exterior housing formed of polymer, defining a cavity; and
a pipe carried by said exterior housing, said pipe defining an interior passage that transports exhaust gases into said cavity to attenuate sound;
wherein said pipe is formed of layered fibers formed at least partially of glass, and bound by an inorganic binder,
wherein said fibers define a microporous inner surface of said interior passage, and
wherein said exhaust subsystem is substantially metal free.

2. The exhaust subsystem of claim 1, wherein said fibers comprise calcium silicate.

3. The exhaust subsystem of claim 1, wherein said fibers comprise ceramics.

4. The exhaust subsystem of claim 1, wherein said layered fibers comprise braided fibers.

5. The exhaust subsystem of claim 1, wherein said inorganic binder is silica or silicate based.

6. The exhaust subsystem of claim 1, further comprising a fiber liner in said housing.

7. The exhaust subsystem of claim 1, wherein said pipe has been pre-molded on a molding core.

8. The exhaust subsystem of claim 1, further comprising sound insulating material within said housing to absorb energy from exhaust gasses transported by said interior passage into said cavity.

9. The exhaust subsystem of claim 8, wherein said sound insulating material comprises glass fiber.

10. The exhaust subsystem of claim 1, further comprising an upstanding wall for supporting said pipe and a second pipe in said housing.

11. The exhaust subsystem of claim 1, wherein said housing has a generally oval cross-section, and wherein said exterior housing if formed in at least two casing portions.

12. A method of forming a pipe for use in an exhaust subsystem, the method comprising:
forming at least one layer comprising fiber material and an inorganic binder on a molding core, wherein said molding core is formed of a thermally conductive material; and curing said inorganic binder, by heating said thermally conductive material by flowing heated gases through said molding core, to form said pipe.

13. The method of claim 12, wherein said at least one layer comprises sheets of fiber material.

14. The method of claim 12, wherein said at least one layer comprises braided fiber material.

15. The method of claim 12, further comprising removing said pipe from said molding core.

16. The method of claim 12, wherein said molding core comprises apertures to guide said heated gases from an interior of said molding core to said pipe.

* * * * *